United States Patent
Jayaram

(10) Patent No.: US 9,171,315 B1
(45) Date of Patent: Oct. 27, 2015

(54) SYSTEM AND METHOD FOR NEGOTIATING ITEM PRICES

(75) Inventor: Ranjith Jayaram, San Jose, CA (US)

(73) Assignee: Google Inc., Mountain View, CA (US)

( * ) Notice: Subject to any disclaimer, the term of this patent is extended or adjusted under 35 U.S.C. 154(b) by 656 days.

(21) Appl. No.: 13/439,796

(22) Filed: Apr. 4, 2012

(51) Int. Cl.
G06Q 30/00 (2012.01)
G06Q 30/02 (2012.01)

(52) U.S. Cl.
CPC ................... G06Q 30/0222 (2013.01)

(58) Field of Classification Search
CPC .................................. G06Q 30/0222
USPC ...................................... 705/14.23
See application file for complete search history.

(56) References Cited

U.S. PATENT DOCUMENTS

| | | | |
|---|---|---|---|
| 7,647,247 B2 | 1/2010 | Abraham et al. | |
| 2002/0198774 A1* | 12/2002 | Weirich | 705/14 |
| 2003/0009417 A1 | 1/2003 | Pappas | |
| 2005/0228757 A1 | 10/2005 | Sun et al. | |
| 2008/0046298 A1 | 2/2008 | Ben-Yehuda et al. | |
| 2009/0132348 A1* | 5/2009 | Bria et al. | 705/10 |
| 2009/0177695 A1 | 7/2009 | Mahajan et al. | |
| 2009/0313055 A1 | 12/2009 | Martin et al. | |
| 2010/0030578 A1 | 2/2010 | Siddique et al. | |
| 2010/0030594 A1 | 2/2010 | Swart | |
| 2010/0185514 A1 | 7/2010 | Glazer et al. | |
| 2010/0268661 A1 | 10/2010 | Levy et al. | |
| 2011/0016023 A1 | 1/2011 | Zakas | |
| 2011/0041083 A1 | 2/2011 | Gabai et al. | |
| 2011/0093361 A1 | 4/2011 | Morales | |

* cited by examiner

*Primary Examiner* — John G Weiss
*Assistant Examiner* — Scott C Anderson
(74) *Attorney, Agent, or Firm* — McDermott Will & Emery LLP

(57) ABSTRACT

A system and machine-implemented method for providing a user participating in an online shopping environment with a negotiated price for an item, the method comprising receiving a request to negotiate a price of an item being posted to an online shopping environment and offered at a first price, identify purchase context information corresponding to the item in response to receiving the request, wherein the purchase context information include information regarding the item and information regarding the online shopping environment, determining a negotiated price for the online item based on the purchase context information and providing the negotiated price for display to one or more users.

17 Claims, 10 Drawing Sheets

SYSTEM AND METHOD FOR NEGOTIATING ITEM PRICES

BACKGROUND

The subject disclosure generally relates to online shopping applications, and, in particular, to facilitating price negotiation in online shopping applications.

The growing number of online and physical stores offering similar items has led to growing competition as items become available for purchase through more and more retailers. stores may try to compete with one another by providing an item at a lower price than their competitors. Some stores also offer price matching. Furthermore, some price negotiation services provide a mechanism for "name your own price" price negotiation when purchasing an item. However, these price negotiation services are only available for limited products and require the user to name their own specific price. Furthermore, retailers have to predefine their negotiation price based solely on knowledge that a consumer wants a lower price and without further information that may be useful in deciding whether to offer lower prices to consumers.

As online shopping becomes more popular and items become available through a growing number of online retailers and physical stores, an efficient method of negotiating prices for users shopping for an item may be desirable.

SUMMARY

The disclosed subject matter relates to a method for providing a user participating in an online shopping environment with a negotiated price for an item, the method comprising receiving a request to negotiate a price of an item being posted to an online shopping environment and offered at a first price. The method further comprising identify purchase context information corresponding to the item in response to receiving the request, wherein the purchase context information include information regarding the item and information regarding the online shopping environment. The method further comprising determining a negotiated price for the online item based on the purchase context information and providing the negotiated price for display to one or more users.

The disclosed subject matter also relates to a system for providing a user participating in an online shopping environment with a negotiated price for an item, the system comprising one or more processors and a machine-readable medium comprising instructions stored therein, which when executed by the processors, cause the processors to perform operations comprising identifying an item being posted to an online shopping environment and offered at a first price. The operations further comprising identifying purchase context information corresponding to the item, wherein the purchased context information includes one or more of number of users interested in purchasing the item, information regarding the one or more users purchasing the item, one or more competing items, information regarding the one or more competing items, feedback information regarding the online item, feedback information regarding the competing items or information regarding the social shopping environment. The operations further comprising determining a negotiated price for the online item based on the purchase context information and providing the negotiated price for display to one or more users.

The disclosed subject matter also relates to a machine-readable medium comprising instructions stored therein, which when executed by a machine, cause the machine to perform operations comprising receiving a request to negotiate a price of an item being posted to an online shopping environment and offered at a first price. The operations further comprising identify purchase context information corresponding to the item in response to receiving the request, wherein the purchase context information include information regarding the item and information regarding the online shopping environment. The operations further comprising determining a negotiated price for the online item based on the purchase context information. The determining step comprising identifying negotiation criteria associated with the item, the negotiation criteria defining conditions that when met result in the negotiated price. The determining step further comprising comparing the purchase context information and the negotiation criteria and determining that the purchase context information meets the conditions in response to the comparing. The operations further comprising providing the negotiated price for display to a user.

The disclosed subject matter relates to a method for providing incentives to a user for purchasing an item, the method comprising receiving an indication of a item being considered for purchase within an online shopping environment and at least one competing item, wherein the at least one competing item is an item that can be purchased as an alternative to the item and includes a higher purchasing likelihood than the item, the purchasing likelihood indicating the chances of an item being purchased. The operations further comprising providing a notification to a store associated with the item that at least one competing item exists, and providing the store with information regarding the at least one competing item. The operations further comprising receiving one or more incentives from the store for encouraging the user to select the item over the at least one competing item in response to notifying the store and providing the one or more incentives for display to one or more users.

The disclosed subject matter also relates to a system for providing a user participating in an online shopping environment with a negotiated price for an item, the system comprising one or more processors and a machine-readable medium comprising instructions stored therein, which when executed by the processors, cause the processors to perform operations comprising receiving an indication of a item and at least one competing item being considered for purchase by one or more users within an online shopping environment, wherein the at least one competing item is an item that can be purchased as an alternative to the item and includes a higher purchasing likelihood than the item, the purchasing likelihood indicating the chances of the item being purchased by at least one of the one or more users. The operations further comprising identifying purchase context information in response to receiving the indication, wherein the purchase context information includes one or more of information regarding the item, information regarding the at least one competing item and information regarding the online shopping environment. The operations further comprising determining one or more incentives associated with the item based on the purchase context information, the one or more incentives including one or more of a competing price for the item and/or one or more additional benefits or items provided to a user conditioned upon the purchase of the item and providing the incentives for display to the one or more users.

The disclosed subject matter also relates to a machine-readable medium comprising instructions stored therein, which when executed by a machine, cause the machine to perform operations comprising receiving an indication of a item posted to a social shopping trip, the social shopping trip including one or more items including the item posted to the trip by one or more participants of the social shopping trip, and providing a mechanism for receiving feedback regarding the one or more items from the one or more participants. The operations further comprising identifying at least one competing item, wherein the at least one competing item is an item that can be purchased as an alternative to the item. The operations further comprising identifying purchase context information in response to receiving the indication, wherein the purchase context information includes one or more of information regarding the item, information regarding the at least one competing item and information regarding the social shopping trip. The operations further comprising determining one or more incentives based on the purchasing context information for enticing the user to select the item over the at least one competing item and providing the one or more incentives for display to the one or more participants.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
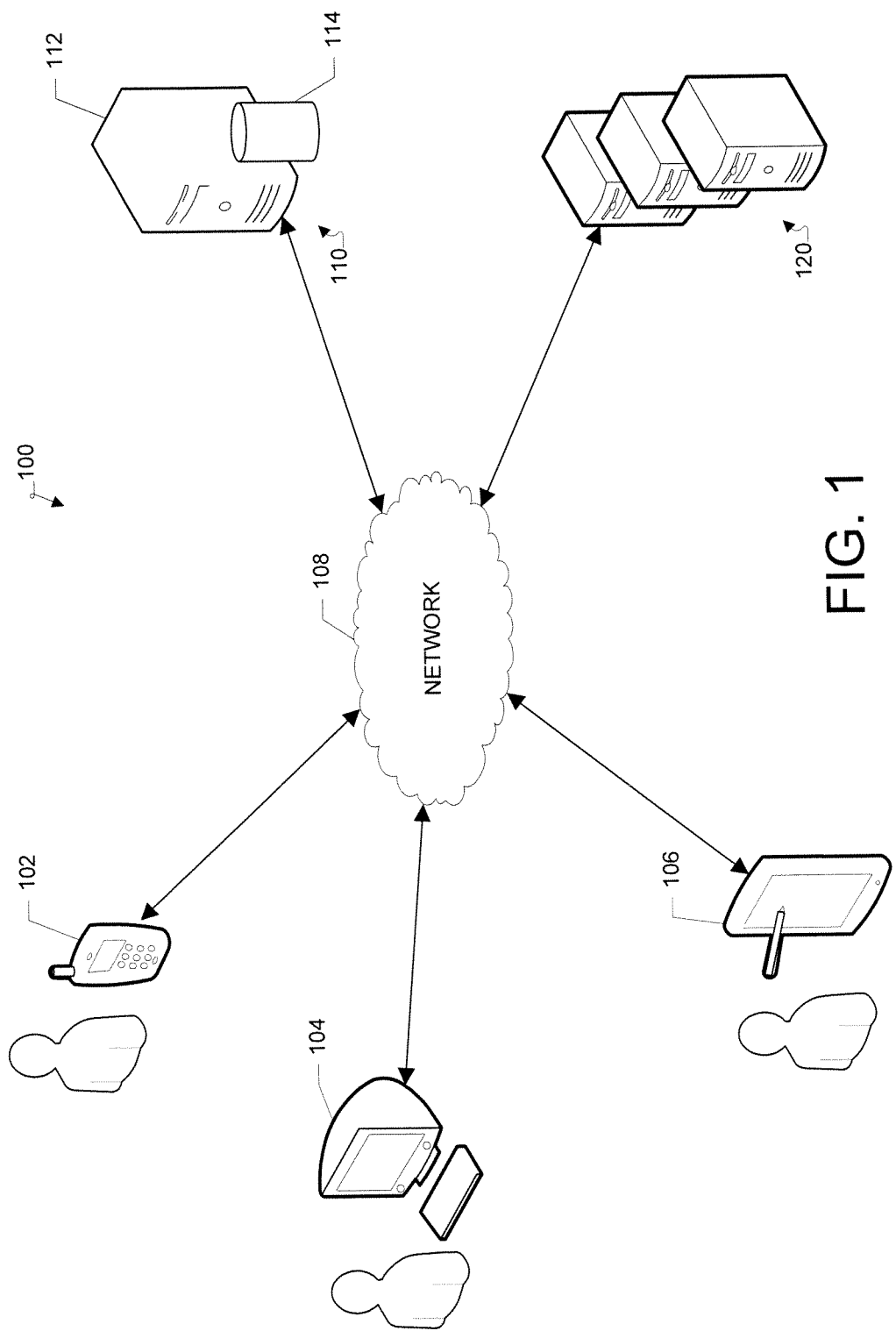
FIG. 1 illustrates an example client-server network environment which provides for facilitating social shopping trips.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a method for negotiating prices for an item based on a user's participation in a social shopping environment with one or more other users (e.g., a social shopping trip). Based on the activities of participants within a social shopping environment (e.g., a social shopping trip), the system may provide the user with a mechanism for price negotiation on items the user intends to purchase. Two types of price negotiation may be performed by the system. The first price-negotiation technique is based on the context of a social shopping environment. For example, a user may be a participant of a social shopping trip or may otherwise shop for items with one or more other users.

In one example, a user may engage in social shopping trips with one or more online contacts using a social shopping application. The social shopping application facilitates collaboration and feedback between shoppers without limiting the flexibility and variety provided by online shopping and provides for a shopping experience among users who are not necessarily physically located near one another. The social shopping application further supports the ability to extend a social shopping experience beyond online shopping and into shopping at physical stores.

A user may log into a social shopping application and begin a social shopping trip. Once the user begins the social shopping trip, the user is then asked to enter information regarding the context of the social shopping trip (e.g., the items and/or types of items that the user wishes to shop for). The context information may include information on the item or types of items that the user creating the social shopping trip and/or the participants of the social shopping trip wish to shop for and may include various item characteristics such as item type, category, brand, retailer, price range, color, and other similar item characteristics. Once the user has entered the context information, then the user may designate one or more contacts or groups (e.g., social circles) to be invited to join the social shopping trip. Alternatively, the user may ask that the invitation to shop be shared with all contacts of the user (e.g., at one or more social networking sites). Still further, once the user enters the context information regarding the social shopping trip, the system may use such information to recommend one or more contacts for the specific social shopping trip (e.g., based on various information regarding the contacts such as past social shopping trip experiences and/or profile information indicating contact shopping interests or expertise).

The user may select one or more contacts for joining the social shopping trip. The selected contacts are then notified about the ongoing social shopping trip and provided with the context of the social shopping trip. The invitees may then request to join the social shopping trip. Contacts may be added to the trip before or during the social shopping trip. In one example, only the creator of the social shopping trip may add participants to the shopping trip. In another example, all participants of the shopping trip may add others to the shopping trip. The creator may be notified of an invite sent by other participants and may have to approve the invite before the invitation is sent to the invitee and/or before the invitee can join the shopping trip.

Once the social shopping trip participants (e.g., the user initiating the social shopping trip or contacts joining the social shopping trip) are ready to begin the social shopping trip, the participants may individually browse various retailer websites (e.g., similar to a solitary online shopping experience), or physical stores, for items that the participants may be interested in purchasing and/or recommending to other participants. The retailer sites and physical stores are independent from the social shopping application, and are not required to vary any infrastructure to allow for social shopping trips according to the embodiments of the present subject matter.

The social shopping trip application may be implemented as a browser extension or a separate browser-based or software-based application. Upon receiving an indication of a user being at an online retailer site, the social shopping application may determine an item being viewed by the user (e.g., using the URL) and post the item being viewed to the social shopping application. Similarly, a participant at a physical store may scan a barcode and/or enter information regarding the item (e.g., take a picture, write a description) and may select to share the item with other participants of the social shopping trip. Once the system detects an indication of interest of a participant in a certain item, the item is then posted to the social shopping application for review and comment by all other participants in the social shopping trip. In another example, online retailer sites may integrate social shopping trip capability into their website. For example, an online store may provide a button to launch the social shopping application and/or a button to post the item currently being viewed to the social shopping trip.

The system may also, with proper permissions, provide information as to the location of the participants (e.g., the online store or physical store that the user is currently at) and/or participants may explicitly share information about the online website or physical store they are currently shopping at, to prompt other participants to visit the same stores (e.g., online site or physical store), thus making the shopping experience less solitary.

Participants can vote and comment on items posted by other participants. The social shopping trip display includes mechanisms for receiving feedback regarding the posted items from the participants of the social shopping experience. The participants can for example endorse an item posted by other participants, rate the item, vote "yes" or "no" on the item or recommend other items in lieu of the posted items to participants. In one example, the system may further provide mechanisms such that users can provide reasons for their feedback (e.g., endorsement, opinions and rating) regarding an item. For example, the system, upon receiving a certain endorsement, rating or other opinion regarding the item, may provide a list of reasons to the user and the user may select a reason for providing the feedback. The reasons provided for selection to the user may be customized to the feedback provided by the user. For example, a specific type of rating, vote or opinion, may trigger a listing of reasons specific to the feedback provided by the user. Additionally, the system may provide the user with a comment box where the user may provide feedback, an explanation about their feedback or comments regarding the item.

In addition to providing mechanism for feedback, the social shopping trip may further provide chat capability such that the participants of the social shopping trip may discuss various items or other information relating to the shopping trip using the chat capability. In one example, in addition the chat capability may be used for topics unrelated to the social shopping trip.

Items posted by each participant may be items intended for the participant or item recommendations for other participants within the social shopping trip (e.g., recommendations for the user initiating the social shopping trip). The system may receive the feedback from each of the one or more participants and updated the social shopping trip to display the feedback associated with each items to the one or more participants. Thus, the participants are able to view the items posted to the social shopping trip and all feedback provided by the participants and associated with the posted items. Based on the comments, feedback or votes by various participants of the social shopping trip, a participant may select an item from the social shopping trip and add the item to a social shopping cart for purchase.

Based on the activities of participants within a social shopping trip, the system may provide the user with a mechanism for price negotiation on items the user is interested in purchasing. The system may receive a request from participants of a social shopping trip to check for price negotiation opportunities. Alternatively, for items selected by participants and posted to a social shopping trip and/or a social shopping cart, the system may automatically determine if the items include negotiation offers and may provide an indication to the user (e.g., an icon displayed next to the price). The user may request to perform a negotiation where a negotiation is possible (e.g., using the icon).

Upon receiving a request, or automatically upon determining that a user intends to purchase an item (e.g., by posting the item to the social shopping trip and/or social shopping cart), the system may check one or more databases storing negotiation criteria. Several criteria may be used for performing a context-based price negotiation including the number of participants involved in a social shopping trip and/or the quantity of items that the participants wish to purchase. For example, the system may identify items having special negotiation offers for groups of people. The system may then retrieve negotiated prices based on the number of participants buying an item. Similarly, if a communal social shopping cart is available, and an item is placed within the communal social shopping cart, the system may automatically check whether group negotiated prices are available for the items added to the social shopping cart, the system may notify the user and the participants. Similarly, if the system detects several participants selecting the same item for purchase, the system may similarly determine whether a lower price can be negotiated based on the number of participants wishing to purchase the item.

Similarly, other context information may be helpful to retailers such as item characteristics of the items within the social shopping trip, user preferences of the participants of the social shopping trip and historical purchasing data. For example, the system may determine a purchasing likelihood for the item, and may further determine the likelihood that the purchase will results in future purchases and such information may be used as price negotiation criteria to provide the participants with a negotiated price. The purchasing likelihood indicates a likelihood that the item will be purchased (e.g., by one or more participants of the social shopping trip) and may be determined based on various information including the purchase history of the user, the item characteristics associated with the social shopping trip, whether any competing items are posted to the social shopping trip, feedback data regarding the item, user preferences, and/or explicit information or feedback provided by the one or more users indicating an interest in the item. The purchasing likelihood may be calculate for the item under the present conditions (e.g., for the present price), for one/or alternative prices (e.g., the chances of purchase if the item is offered at a certain price) and/or for one or more other additional incentives.

For example, item characteristics associated with the social shopping trip are determined based upon one or more of context information provided by participants of the shopping trip (e.g., the user creating the shopping trip), items added to the shopping trip, feedback provided by the participants of the shopping trip, and items added and/or to a social shopping cart associated with the social shopping trip and/or one or more participants of the social shopping trip. The item characteristics may include price range, color, category, brand, store, store type, or other similar item characteristics determined to be preferred and/or desirable according to the activity of the participants of the social shopping trip.

The system may further take into account preferences of each of the participants of the social shopping trip. The social shopping application may maintain a user profile associated with each user. Each user may be a participant in one or more social shopping trips. The system may determine user preferences based on the user's activity in past or ongoing social shopping trips. Such preferences may include item characteristics such as brand, color, size, price range, category, store, store type, or other similar item characteristics preferred by the user based on their social shopping activity and purchase history. In addition, the system may determine one or more contact preferences for each user (e.g., contacts the user usually enjoys shopping with or relies on when making purchasing decisions). The system may also identify historical information regarding similar social shopping trips or users (e.g., based on the item characteristics associated with the social shopping trip and or participants) and may provide the historical information as purchase context information for negotiation purchases.

A second price negotiation technique involves competitive-based price negotiation. The system may allow stores to compete more efficiently by providing stores with an opportunity to compete for purchasers when competing items are posted and favored (e.g., based on feedback data), and allowing the store to provide incentives to the user to increase the chance of the user purchasing the item from the store. For example, where multiple similar items are posted to the social shopping trip and one is favored (e.g., based on feedback by participants or being placed within a social shopping cart of one or more participants), the system may notify the other stores (e.g., online retailer, physical store) that the user is likely to pass on their item. The store may provide a lower price or other incentives to encourage the participants better compete with the store providing the competing item. Thus, the system provides the participants and stores with an effective way for negotiating prices.

Additionally, when participants post an item from a first retailer, the system may search for other retailers offering the item for sale and may search for best offered prices. The availability of better offers may be a criteria used when negotiating prices for the user. For example, the system may identify an item being offered at a better price and may determine if the original retailer or any other retailers offering the item for sale are willing to offer a better price or other incentives to the participants of the social shopping trip to entice the participants to shop from that retailer.

Stores may provide pre-defined price negotiation criteria and the system may determine negotiated prices for items based on the pre-defined price negotiation criteria. For example, the system may access a price negotiation database (e.g., over a remote price negotiation service or directly through the system). The database may include combinations of price negotiation criteria (e.g., number of users willing the purchase an item, quantity of item, purchasing history of users, purchasing likelihood, presence of competing items, price difference with competing items) and lower prices and/or other incentives (e.g., one or more based on the negotiation criteria met). The system may compare the information with the pre-defined price negotiation criteria to provide the user with a negotiated price upon determining information regarding the items posted to a social shopping trip (or other social shopping application or environment).

Alternatively, the system may provide notifications to stores upon receiving a request from a user to obtain a better price or negotiate the price of goods. Stores (e.g., online retailers, physical stores) may subscribe to notifications from the system, and may provide negotiated prices on a case-by-case basis.

The term "item," as used herein, encompasses its plain and ordinary meaning including, but not limited to, various products or services offered for sale at one or more online sites and/or physical stores. Each "item" may be identifiable by a name, model number, series number, and/or a item identifier (e.g., item identification number or barcode), and may be associated with "item information" such as name, price, availability, source (i.e. the site or physical store offering the item for sale), visual characteristics (e.g., size, color, shape), description (e.g., description of features), manufacturer, or other similar information.

The term "online retailer site" as used herein encompasses its plain and ordinary meaning including but not limited to a webpage, website, web application or other software-based application, tool or entity accessible to a user over the internet and offering one or more items available for sale. The term may encompass both retailers directly selling the item, or tools, websites or entities providing a link to one or more retailers providing the item for sale. The terms "online retailer site", "retailer site" or "online store" may be used interchangeably throughout the description of the subject matter and encompass same or similar meanings. The term "physical store" as used herein encompasses its plain and ordinary meaning, including, but not limited to, a brick and mortar store, or other offline entity or establishment accessible to the user offline (i.e., other than through the internet) and offering one or more items for sale. The terms "retailer" and "store" may be generally used throughout the embodiment and generally refers to "online retailer sites" or "physical stores" providing an item offered for sale.

Users of social networking services may create associations with one another. The phrase "social networking service" as used herein encompasses its plain and ordinary meaning, including, but not limited to, an online service, platform or site that focuses on building and reflecting of social associations and interactions among users. These associations may be stored within a social graph at each social networking service. Such user associations may be defined on a user-to-user basis, or as a group of users associated through membership within a group. As used herein, "contacts" refer to other users that a user is associated with, at one or more social networking services.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

II. Example Client-Server Network Environment for Facilitating a Social Shopping Experience FIG. 1 illustrates an example client-server network environment which provides for facilitating social shopping trips and/or price negotiation for one or more items. A network environment 100 includes a number of electronic devices 102, 104 and 106 communicably connected to a server 110 and/or remoter servers 120 by a network 108. Server 110 includes a processing device 112 and a data store 114. Processing device 112 executes computer instructions stored in data store 114, for example, for facilitating a social shopping trip application for use at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

A user interacting with a client device (e.g., electronic devices 102, 104 and 106) may access a social shopping client application and provide login information (e.g., using a user name and password). The client application may be a stand alone browser-based or other software-based application at the user's computer, or may be embedded as a feature within one or more software or browser-based applications running on the client device, within a browser (e.g., a social networking service or an online retailer site) or as a browser extension or may be implemented as a mobile application.

The login information may be received at a server hosting the social shopping system (e.g., server 110), and the user may be authenticated. The server hosting the social shopping application may maintain one or more shopping trips, and one or more user accounts for users of the social shopping application (e.g., participants participating in such shopping trips). The social shopping trip may be associated with including context information, list of participants, identity of trip creator, etc. The server (e.g., server 110), may further maintain an association between social trips and one or more items posted to each of the social trips. The items may further be associated with item information, retailer information and feedback data received from one or more participants of the social trip. Additionally, the social shopping trip may maintain one or more social shopping carts associated with each user of the social shopping application or group social shopping carts associated with a social shopping trips or groups of users. The information may be stored at one or more databases communicably coupled to the server (e.g., server 110).

The system may retrieve information regarding the user, including one or more social shopping trips that the user is participating in and may provide a data set including information regarding each social shopping trip (e.g., items, item information and/or feedback data) to the client device of the user. The client device may then generate a shopping application user interface displaying one or more shopping trips that the user is participating in. The social shopping application user interface may be displayed as a window at a side of the user interface displaying a third party retailer site the user is currently viewing, or may be embedded within one or more third party retail sites accessible through the browser. Additionally, the social shopping application may be implemented as a mobile application at the user's mobile device.

Once within the social shopping application, the user may create one or more social shopping trips and invite one or more contacts to participate in those social shopping trips. In one example, the user may create a shopping trip and enter information regarding the shopping trip (e.g., at the social shopping application user interface). The participants of the shopping application may browse online retail sites and physical (offline) stores and may add one or more items to a social shopping trip. The user may further select items posted to the social shopping trip and add one or more of the items to a social shopping cart for purchase.

Upon selecting an item for purchase, e.g., selecting the item from the retailer site or physical store, posting the item to a social shopping trip, adding the item to a social shopping cart and/or selecting the item from the social shopping cart for purchase, the user may request that the system (hosted at server 110) negotiate the price of the item. In one example, a button may be displayed to the user (e.g., within the social shopping application interface or tool bar of the browser) and the user may issue a request to obtain a negotiated price. In another example, the system may detect the user selection to purchase an item and may automatically perform the price negotiation. For example, the automatic price negotiation may be set as a default based on user or system settings. In another example, one or more stores (e.g., online retailers or physical stores) may opt into a price negotiation service, where the system will perform price negotiation where price negotiation may provide a competitive advantage to the store. The system, upon detecting that a competitive-based price negotiation is requested, may perform the price negotiation.

In one example, the option to negotiate a price may only be available for selected items. Upon receiving an indication of user interest in an item (e.g., when the item is posted to the social shopping and/or a social shopping cart), the system may determine whether the store associated with the item has provided price negotiation data for the item and/or stated that price negotiation is available for the item.

Upon receiving a request to negotiate the price of an item (e.g., from the user or based on a condition signaling automatic negotiation), the system may identify purchase context information regarding the item, the context of the social shopping trip and/or competitive information (e.g., other similar items, information regarding the similar items, store information, feedback data). The system may access one or more databases storing price negotiation criteria. The price negotiation criteria are compared against the purchase context information by the system to arrive at a negotiated price for the user. In another example, the system sends the gathered information to the store or one or more stores and requests a negotiated price based on the information. The system may further provide an auction environment where stores can bid for the purchase by offering better prices or incentives. In addition to price negotiation, the system may further request and/or receive additional incentives from stores to entice the user to purchase the item from the specific store.

According to some aspects, remote servers 120 can be any system or device having a processor, a memory and communications capability for hosting various online retailer sites, remote social networking services, a price negotiation service, one or more price negotiation databases, and/or an item search service. In one embodiment, remote servers 120 may be further capable of maintaining social graphs of users and their contacts. The remote social networking services hosted on the remote servers 120 may enable users to create a profile and associate themselves with other users at a remote social networking site. The remote servers 120 may further facilitate the generation and maintenance of a social graph including the user created associations. The social graphs may include, for example, a list of all users of the remote social networking site and their associations with other users of a remote social networking site. Remote servers 120 may further host an item search service coupled to one or more databases (hosted by remote servers 120) maintaining information regarding items available online at one or more online retailer sites or at a physical store.

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. Communications between the client devices 102-106, server 110 and/or one or more remote servers 120 may be facilitated through the HTTP communication protocol. Other communication protocols may also be facilitated including for example, XMPP communication, for some or all communications between the client devices 102-106, server 110 and one or more remote servers 120.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

III. Processes for Facilitating a Social Shopping Experience

Figure 2:
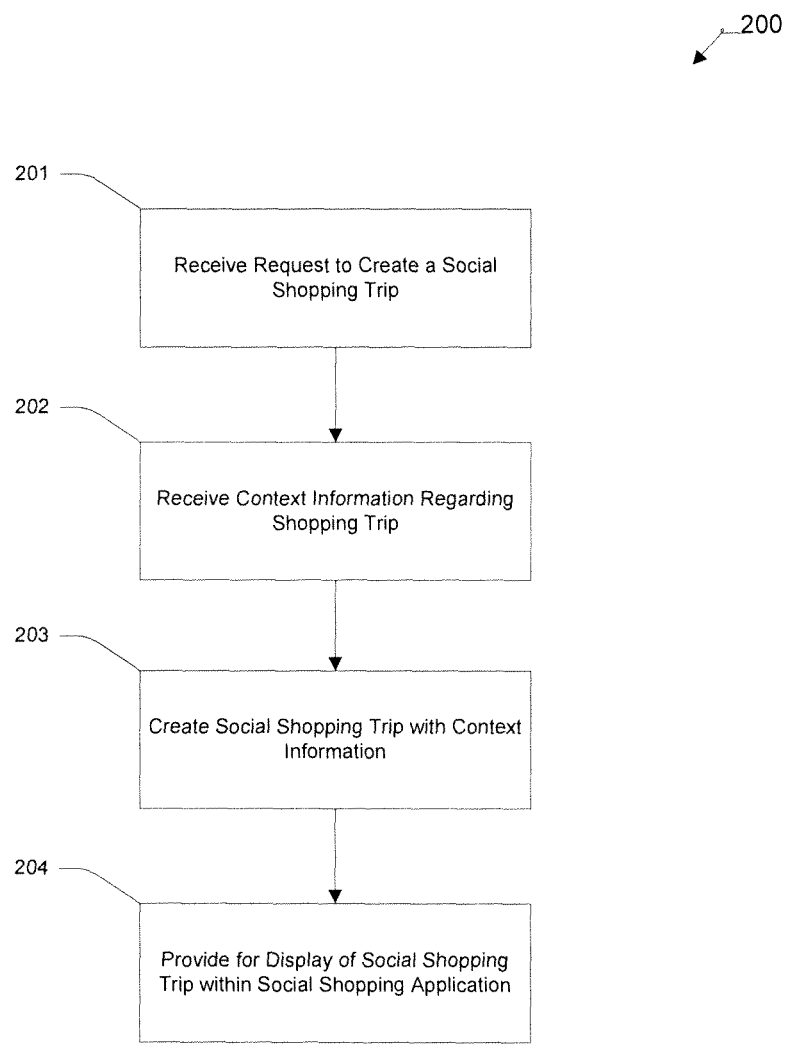
FIG. 2 illustrates a flow chart of an example process for creating a social shopping trip.

FIG. 2 illustrates a flow chart of an example process 200 for creating a social shopping trip. In block 201, the system receives a request to create a social shopping trip. A user may log into a social shopping application and initiate a social shopping trip. Once the user requests to add the social shopping trip, the user may input information regarding the context of the social shopping trip. The context information may include a set of keywords associated with the social shopping trip (e.g., the items and/or types of items that the user wishes to shop for and/or other shopping trip objectives). In one example, the user may input the set of keywords and/or may input free-form natural language text describing what he/she wishes to do during the trip. The system may receive the free-form input and extract relevant intelligence and/or information (e.g., one or more keywords such as item, item types and/or other trip objectives). The extracted information may be associated with the social shopping trip as context information. In one example, each social shopping trip is limited to items relating to the context specified by the user. The user may create a shopping trip and enter information regarding the shopping trip at the social shopping application user interface.

In block 202, the system receives the context information regarding the social shopping trip. In one example, the context information may include a set of keywords associated with the social shopping trip (e.g., the items and/or types of items that the user wishes to shop for and/or other shopping trip objectives). Additionally, the system may recommend additional keywords to the user for selection and inclusion as part of the context information. In one example, the user or other participants of the social shopping trip (with proper permission or approval from the user) may modify the context information (e.g., to add or remove one or more keywords associated with the social shopping trip).

In block 203, the system creates a social shopping trip and associates the received context information with the social shopping trip. The information entered by the user and received in block 202 may be received at the social shopping system (e.g., hosted at server 110) and used to create an instance of a social shopping trip associated with the user account of the user. Furthermore, the user is added as the first participant of the shopping trip. The system may further receive a request to invite one or more contacts or groups (e.g., social groups) to the social shopping trip. Alternatively, the user may ask that the invitation to shop be shared with all contacts of the user (e.g., at one or more social networking sites). Still further, once the user enters the context information regarding the social shopping trip, the system may use such information to recommend one or more contacts for the specific social shopping trip (e.g., based on various information regarding the contacts such as past social shopping trip experiences and/or profile information indicating contact shopping interests or expertise). An example process for adding participants to the social shopping trip is described in further detail below with respect to FIG. 3.

In block 204, the social shopping trip is provided for display within a user interface displaying the social shopping application associated with the user's user account. In one example, the user may be associated with more than one shopping trip and the shopping trips may be displayed as tabs, lists or otherwise displayed to the user within the social shopping application user interface. An example graphical user interface displaying a social shopping trip is discussed in further detail below with respect to FIG. 7.

Figure 3:
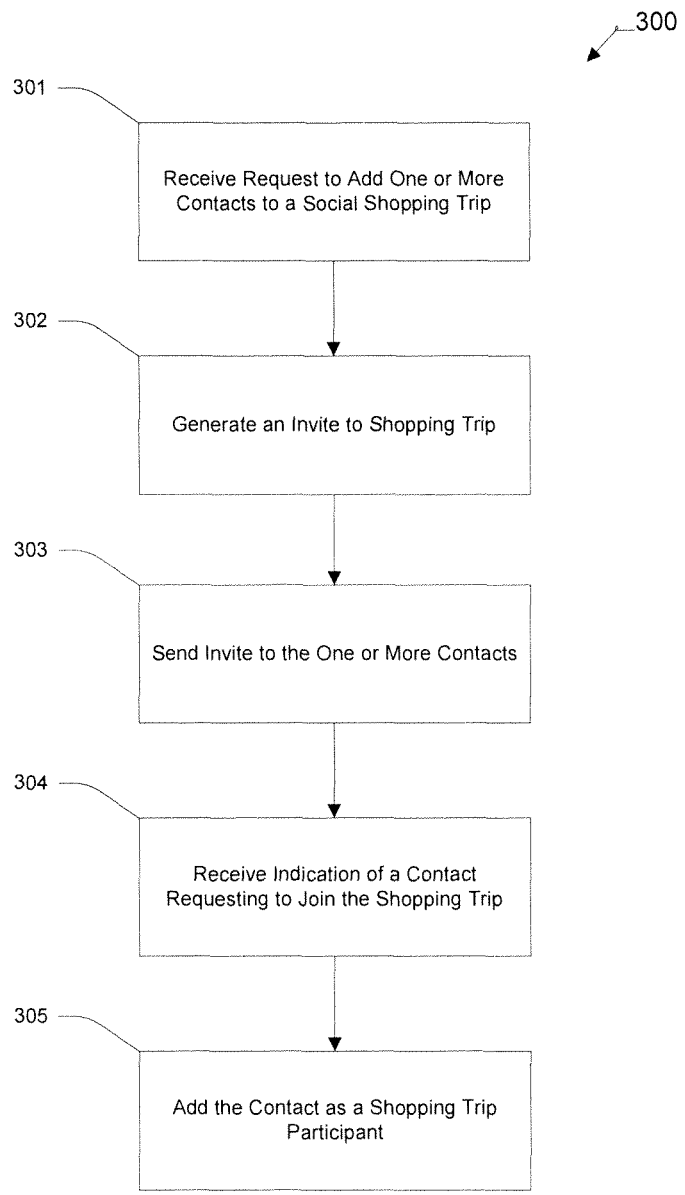
FIG. 3 illustrates a flow chart of an example process for adding participants to a social shopping trip.

FIG. 3 illustrates a flow chart of an example process 300 for adding participants to a social shopping trip. In block 301, the system may receive a request to invite one or more contacts to a social shopping trip. The contacts may include contacts or social groups associated with the user at a social networking service or contacts the user is otherwise associated with (e.g., over e-mail communication, or through real world contacts). The user may enter contact information for each user and/or may provide contact information for each contact. Next, in block 301, the system generates an invite to the shopping trip. The invite may include a link to the social shopping trip, and may further include information regarding the shopping trip (e.g., the context of the shopping trip), to allow the contacts to decide whether they would like to join the shopping trip. Additionally the invite may include a comment or message by the user and/or an automatically generate invite message.

In block 303, the system sends the invite to the one or more contacts (e.g., as an email message and/or messages or post sent to the social networking user accounts of the contacts). In one example, the system may issue a request to the social networking service hosting the user account for the contacts or the social group and may request that the social shopping network post the invite within the user account of each contact (e.g., using an API call). In one example, the post may be posted to the user account of the user at the social networking service and viewable by all contacts associated with the user at a social networking service. The contacts may select the link to join the shopping trip.

In block 304, the system may receive an indication of a contact requesting to join the shopping trip. For example, the contact may select the link or otherwise request to join the shopping trip. Once an indication of a contact joining the shopping trip is received by the social shopping system, in block 305, the system adds the contact as a participant to the social shopping trip. For example, the system may associate the contact with the social shopping trip and provide a data set including information regarding the shopping trip for display to the contact at the contact's client device. Once the social shopping trip participants (e.g., the user initiating the social shopping trip or contacts joining the social shopping trip) have joined the social shopping trip, the participants may individually browse various online retailer websites (e.g., similar to a solitary online shopping experience), or physical stores, for items that the participants may be interested in purchasing and/or recommending to other participants and the items may be added to the social shopping trip. An example process for adding an item to a social shopping trip is described in further detail below with respect to FIG. 4.

Figure 4:
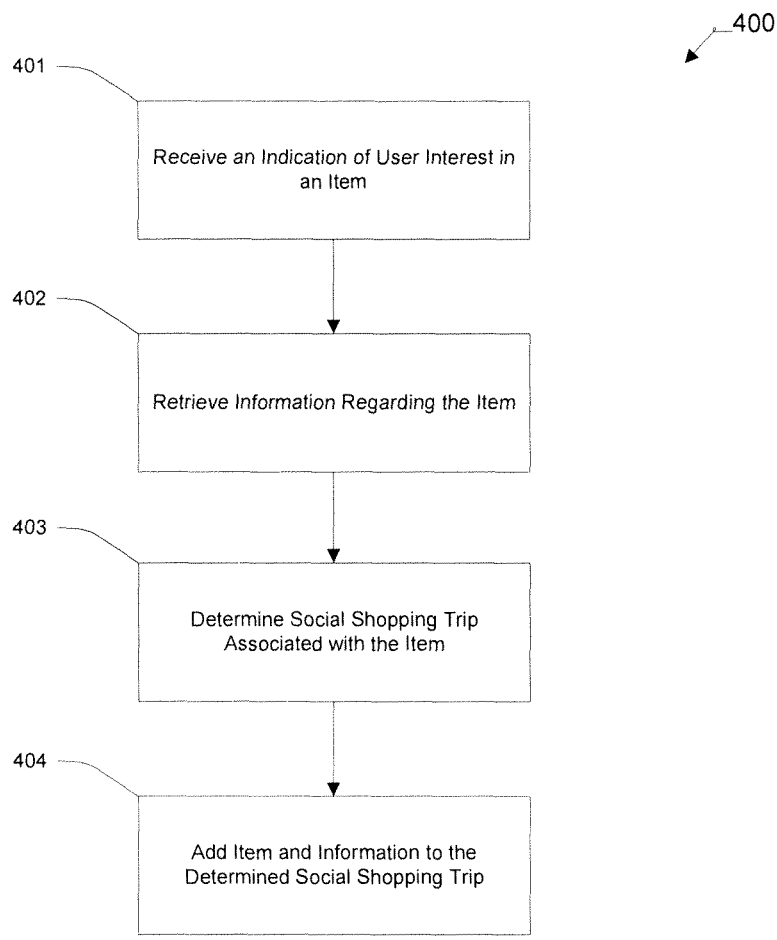
FIG. 4 illustrates a flow chart of an example process for adding an item to a social shopping trip.

FIG. 4 illustrates a flow chart of an example process 400 for adding an item to a social shopping trip. In block 401, the system receives an indication of user interest in an item. The participants of the social shopping trip may browse online retail sites and physical (offline) stores and may add one or more items to a social shopping trip. For example, when browsing one or more online retailer stores, the user may click a button to add the item currently being viewed to the social shopping trip. Similarly, a participant at a physical store may scan a barcode and/or enter information regarding the item (e.g., take a picture, write a description) using a mobile social shopping application and may select to share the item with other participants of the social shopping trip. The system may also automatically detect user interest in an item (e.g., when the user views an item for a specific period of time) while the user is logged into the social shopping application.

In one example, the social shopping trip application may receive an indication of the location of the user (e.g., online or at a physical store) and may provide the user with the appropriate user interface for adding the item. For example, where the detected location of the user is a physical store, the user may be provided with prompts to scan a barcode or manually enter information regarding an item. On the other hand, if the user is online, the system may provide a button to the user for importing the item into the social shopping application.

In block 402, the system retrieves information regarding the item. The social shopping application may be implemented as a browser extension. For example, the online location of the user (e.g., a third party retailer website), and the item being viewed by the user at the online location may be detected using the URL. Upon detecting an indication of interest in the item, the browser may detect the URL and notify the browser extension. The browser extension may then send the URL to an item search service (e.g., hosted at a remote server 120). The item search service may search across one or more databases for information regarding the item, and generate an item snippet. The snippet may include item information such as item name, photo, price, description, and other similar item information. The snippet may be sent back to the browser extension, for displaying the item as part of the social shopping application user interface.

Alternatively, some third party retailers may have an embedded button at their website which allows the user to add items to the social shopping application by selecting the embedded button. Once an item is detected, the third party retailer site may retrieve item information regarding the item (e.g., from the specific online site that the user is shopping from), and generate a snippet and provide the snippet to the system for display within the social shopping application. The snippet may include item information such as item name, photo, price, description, and other similar item information.

Similarly, items from a physical store may be selected and shared with the participants of the social shopping trip at the social shopping application. For example, a user at a physical store may take a picture of an item, input manual information regarding the item and/or scan a barcode (or other item identifier) of the item and request to post the item to social shopping trip. The system may retrieve item information regarding the item (e.g., through the item search service using the barcode). For example, upon detecting the item identifier (e.g., barcode), the system may send the identifier to an item search service (e.g., hosted at a remote server 120). The item search service may search across one or more databases for information regarding the item, and generate an item snippet. The snippet may include item information such as item name, photo, price, description, and other similar item information.

Furthermore, the user may manually enter information regarding the item (e.g., a picture, price information, description). The user may also enter a comment or explanation regarding the item (e.g., asking for feedback, recommending the item to another participant of the shopping trip, providing a specific fact about the item). Such information is received by the system and included within the item information associated with the item. Additionally, the system may detect the location of the participant indicating retailer information (e.g., based on the URL, through GPS, through the website or according to user input) and provide the retailer information and include the retailer information with the item information.

In block 403, the system may determine the social shopping trip associated with the item. As described above, each user may participate in several social shopping trips. Thus, when the system receives an indication of user's interest in an item, the system may identify the social shopping trip that the item should be posted to. The items detected or posted to the social shopping trip may be limited to items relating to the context indicated by the user initiating the social shopping trip. For example, the identification may be made according to the context information associated with each social shopping trip. The context information may provide information regarding the objectives of one or participants of the social shopping trip including one or more keywords associated with the social shopping trip (e.g., the items and/or types of items that the user wishes to shop for and/or other shopping trip objectives). The system may determine the appropriate social shopping trip based on such information. Additionally, the system may prompt the user for the appropriate social shopping trip and the user may indicate the appropriate social shopping trip for the item. In block 404, the item along with the information retrieved in block 402, may be posted to the identified social shopping trip within the user's social shopping application. In one example, the system provides various mechanisms within the display area displaying the shopping trip for receiving feedback regarding the item from one or more participants of the social shopping trip. The mechanism may include an endorsement button, a mechanism for indicating a rating of the item, a comment box or other similar means for inputting user opinions regarding the item.

The items posted within the social shopping trip by each participant can be viewed by other participants of the social shopping trip and those participants may provide comments and feedback regarding the item using the provided feedback mechanisms. Participants can vote and comment on items posted by other participants. The social shopping trip user interface may provide mechanisms (e.g., an endorsement button, a rating box, a comment box) for receiving feedback regarding the posted items from the participants of the social shopping experience. The participants can for example endorse an item posted by other participants, rate the items, vote "yes" or "no" on the item or recommend other items in lieu of the posted items to participants. Items posted by each participant may be items intended for the participant or item recommendations for other participants within the social shopping trip (e.g., recommendations for the user initiating the social shopping trip). The system may receive the feedback from each of the one or more participants and updated the social shopping trip to display the feedback associated with each items to the one or more participants. Thus, the participants are able to view the items posted to the social shopping trip and all feedback provided by the participants and associated with the posted items.

Based on the comments, feedback or votes by various participants of the social shopping trip a participant may select an item from the social shopping trip and add the item to a social shopping cart for purchase. In one example, the user interface may include an "add to cart" mechanism and once the participants have decided that they would like to purchase the item, the item may be added to the cart for the participant. An example graphical user interface displaying a social shopping cart is discussed in further detail below with respect to FIG. 8. Furthermore, the social shopping trip may include a group cart, where the participants may add items intended for the entire group. An item within the social shopping cart and/or social shopping trip may be selected for purchase. Alternatively, the user may select an item and request that the system negotiate the price of the item.

The social shopping application unifies the shopping experience of all users shopping separately, online or at physical stores, and displays all items posted by any participant of the social shopping trip to all participants. Thus, the present system facilitates a social shopping experience while maintaining the flexibility of online shopping and further facilitating the combination of online and offline stores. Furthermore, as the social shopping system maintains the associations between users, social shopping trips, items within the social trip, and information and feedback regarding each item, the social shopping application provides a social shopping trip that may be viewed across multiple browser sessions. That is, users of the social shopping application may log out and in of the application and view all social shopping applications in progress that they are participating in. Furthermore, the system provides for seamless participation in social shopping applications across multiple devices, since the social shopping application may be implemented as a web-based or soft-ware based and further may be implemented as a mobile application. Furthermore, the social shopping application may be used across various websites and physical stores without limitation, because the application does not require that the website or physical store infrastructure be changed to support the social shopping application.

Furthermore, the social shopping trip may be shared with other users not necessarily participating in the shopping trip. In one example, a summary of the shopping trip may be generated and made available for viewing by other users. The summary may include a listing of items that were viewed during the social shopping trip and may further include information regarding how those items were rated by the participants of the social shopping trip. The summary may also include further details regarding the social shopping trip such as comments, or other feedback made regarding the items by the participants of the social shopping trip.

IV. Example Processes for Facilitating Price Negotiation

Figure 5:
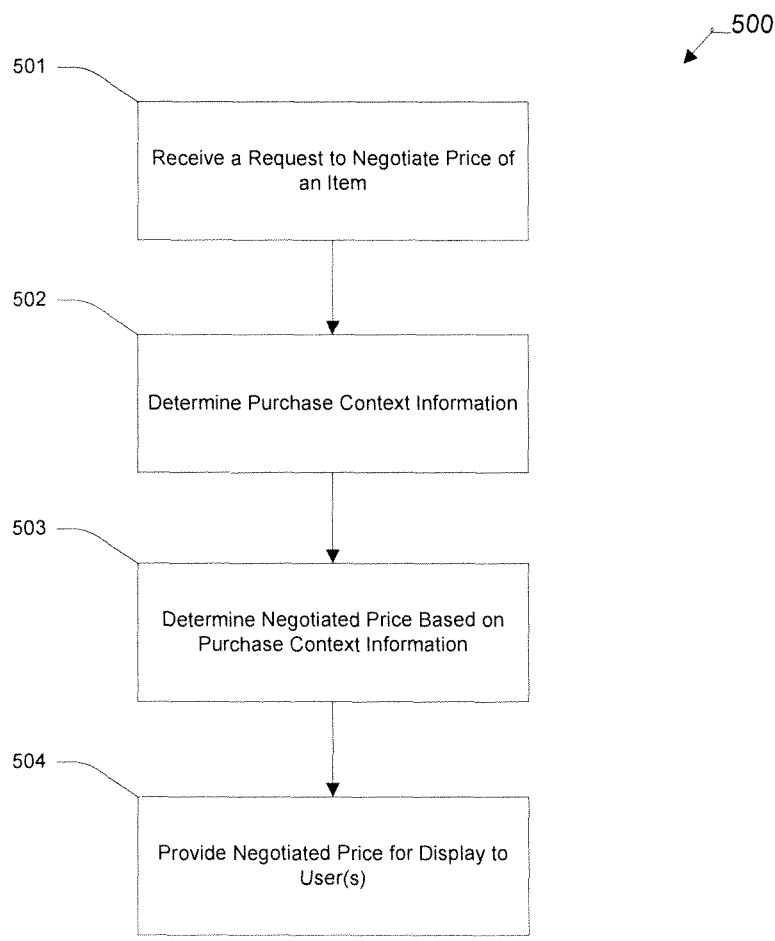
FIG. 5 illustrates a process for facilitating price negotiation for items purchased during a social shopping trip.

FIG. 5 illustrates a process 500 for facilitating price negotiation for items purchased during a social shopping trip. In block 501, the system receives a request to negotiate the price of an item. As described above, the request may be received from a user, may be triggered automatically when the user selects to post and/or purchase the item, or may be triggered based on other conditions indicated by the user, store, or the system. For example, the user may be provided with a price negotiation menu item or button and may select the button or menu item to request that price negotiation be performed with respect to an item. Similarly, the system may detect that the item has been posted (e.g., to the social shopping trip and/or a social shopping cart) and/or selected for purchase (e.g., by selecting a buy button). The user or store may also provide conditions (e.g., competing prices, price alerts, etc.) and when such conditions are met, the system may begin the negotiation process. Accordingly, based on receiving a user request, a store request or other indication that the price negotiation is desirable, the system may initiate the negotiation process. FIG. 9 illustrates screen shots of a graphical user interface displaying example messages to the user during the negotiation process.

In block 502, the system determines purchase context information associated with the item for price negotiation. The purchase context information may include one or more of the identifier of the item (e.g., item ID, item model number), the price of the item, the quantity of item requested, the number of participants in a social shopping trip, information regarding any competing details, feedback regarding the item or competing items, historical information regarding the participants of the social shopping trip, and other context information regarding the social shopping trip.

The purchase context information may further include information regarding whether the item is currently added to a social shopping trip and/or social shopping cart, whether the item is posted to a personal or communal social shopping cart, the context information regarding the social trip, item characteristics associated with items added to the social shopping trip or social shopping cart and other similar information. Such information may for example be helpful in determining a purchasing likelihood for the item, and/or an indication of a price range that may be desirable for the item (e.g., based on feedback regarding the item, price range of other items within the social shopping trip or social shopping cart, other competing items within the social shopping cart or social shopping trip). The purchasing likelihood may be determined and further provided along with the purchase context information.

In block 503, the system determines a negotiated price for the item based on the purchase context information. The system may access one or more databases storing negotiation criteria for the item. The negotiation criteria may include a combination of criteria that when met, would result in a negotiated price. The negotiation criteria may be pre-established and provided to the system or a remote service (e.g., hosted at server 120) and stored at one or more databases. Different prices may be available for different sets of criteria. The purchase context information may be compared against the negotiation criteria to determine whether a better price is offered by the store for the item. Alternatively, the system may provide the purchase context information to the store. The store may then provide a price based on the purchase context information. The store may provide the negotiated price based on pre-established negotiation criteria or may determine a negotiated price on a case-by-case basis. The store may, for example, opt to be notified each time a price negotiation for the item is requested, or may request to be notified for specific sets of criteria (e.g., a combination of negotiation criteria stored at the database may prompt notifying the store).

In block 504, the system provides the negotiated priced for display to the user. The negotiated price may be displayed to the user within the user interface displaying the item at one or more of the social shopping trip and/or the social shopping cart. In one example, in addition to or in lieu of a negotiated price the system may determine one or more incentives associated with the item and offered by the store associated with the item for purchasing the item and may provide the incentives for display to the user (e.g., participant of the social shopping trip).

In addition to price-based negotiations performed to provide users with better prices, the system may further provide stores with a more effective and efficient way of competing for customers.

Figure 6:
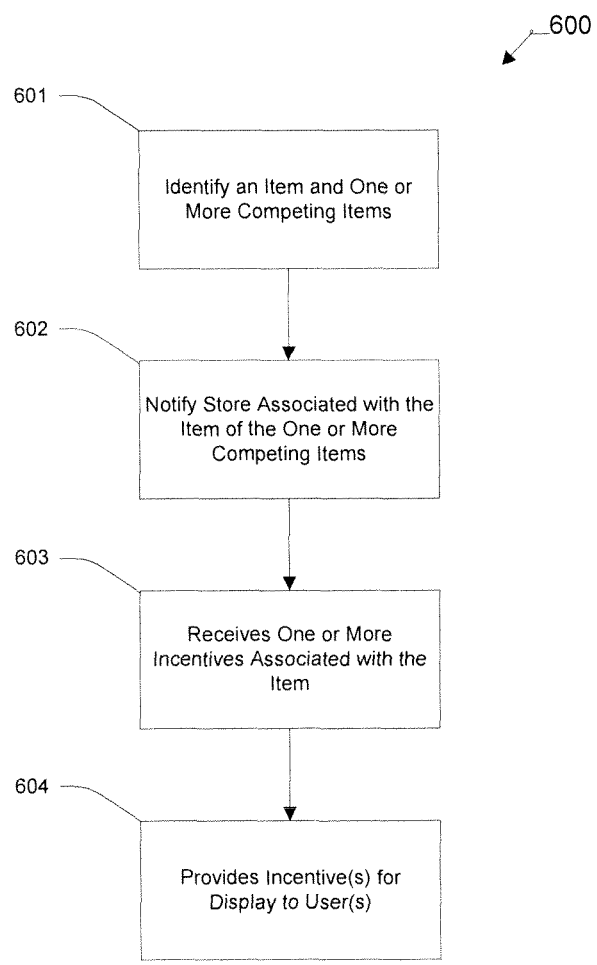
FIG. 6 illustrates an example process for facilitating a competitive-based negotiation.

FIG. 6 illustrates an example process 600 for facilitating a competitive-based negotiation. In block 601, the system identifies an item and one or more competing items. Competing items may include the same item offered by other stores and/or similar items that can be purchased as an alternative to the item (e.g., same category, item type). In one example, the one or more competing items may include items posted to the social shopping trip and/or social shopping cart by the participants of the social shopping trip, item recommendations posted to the social shopping trip and/or social shopping cart, and/or items identified by the system (e.g., one or more items similar to an item posted to the social shopping trip with a lower price). For example, the system may, search for items similar to items posted to a social shopping trip and offered at a better price or as a group offer and may recommend the items to the user. Similarly, in response to a request the system may search for all stores offering an item and determine the store offering the item for the lowest price. The competing items may include all items that may be purchased as an alternative to the item, and/or items having a competitive advantage over the item. Items having a competitive advantage may be determined based on item price, feedback regarding the items (e.g., votes, opinions, ratings), whether the item is selected for purchase and/or added to a social shopping cart, and/or whether user preferences (e.g., based on store preferences or item characteristics preferences) or item characteristics associated with the social shopping trip (e.g., based on the context information, items posted to the trip and/or feedback data regarding the trip) indicate the item is likely to be favored by one or more users (e.g., participants of the social shopping trip).

In block 602, the system notifies the store associated with the item that one or more competing items are available and/or being considered for purchase by the user(s) (e.g., participants of the social shopping trip). The notification may for example be sent to each of the stores offering the item for sale, to the store offering the original item posted by users and/or to stores which offer the item and have opted to receive competitive-based negotiation information. Along with the notification, the system may provide purchasing context information regarding the item and competing item information to the store.

The purchase context information for an item may include one or more of the identifier of the item (e.g., item ID, item model number), the price of the item, the quantity of item requested, the number of participants in a social shopping trip, information regarding any competing details, feedback regarding the item or competing items, historical information regarding the participants of the social shopping trip, and other context information regarding the social shopping trip.

The purchase context information may further include information regarding whether the item is currently added to a social shopping trip and/or social shopping cart, whether the item is posted to a personal or communal social shopping cart, the context information regarding the social trip, item characteristics associated with items added to the social shopping trip or social shopping cart and other similar information. Such information may for example be helpful in determining a purchasing likelihood for the item, and an indication of a price range that may be desirable for the item (e.g., based on feedback regarding the item, price range of other items within the social shopping trip or social shopping cart, other competing items within the social shopping cart or social shopping trip). The purchasing likelihood may be determined and provided along with the purchase context information.

In block 603, the system receives one or more incentives from the store in response to the notification. The incentive may include a new price, extra perks, or other benefits provided to the user to encourage the user to purchase the item from the store (e.g., online retailer and/or physical store) instead of competing stores offering competing items. In one example, the incentive may be provided by the store based on the information provided to the store along with the notification (e.g., if the feedback data indicates a favor for a time of date or number of points or other benefits of the competing item, the store may try to match or surpass the stated benefits). Alternatively, the system may, in response to detecting the competing items search for pre-established competitive-based incentives provides by stores and may retrieve the incentives to the user.

In block 604, the system provides the incentives for display to the user(s) (e.g., participants of the social shopping trip). The incentives may be displayed along with the item to encourage the user to purchase the item over competing items. The received incentives may be displayed to the user within the user interface displaying the item at one or more of the social shopping trip and/or the social shopping cart.

The above processes are described with respect to a social shopping trip for exemplary purposes. It should be understood by one of ordinary skill in the art that one or more of the above processes may be performed with respect to other shopping applications or environments for facilitating price-based and competitive-based negotiation for items offered for sale to one or more users. Furthermore, while the above processes are described as being performed by the system, it should be understood by one of ordinary skill in the art, that one or more of the processes or portions thereof may be performed by one or more independent and/or remote services, to achieve the same results described above with respect to the above processes.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

IV. Example Graphical User Interfaces of a Social Shopping Application

Figure 7:
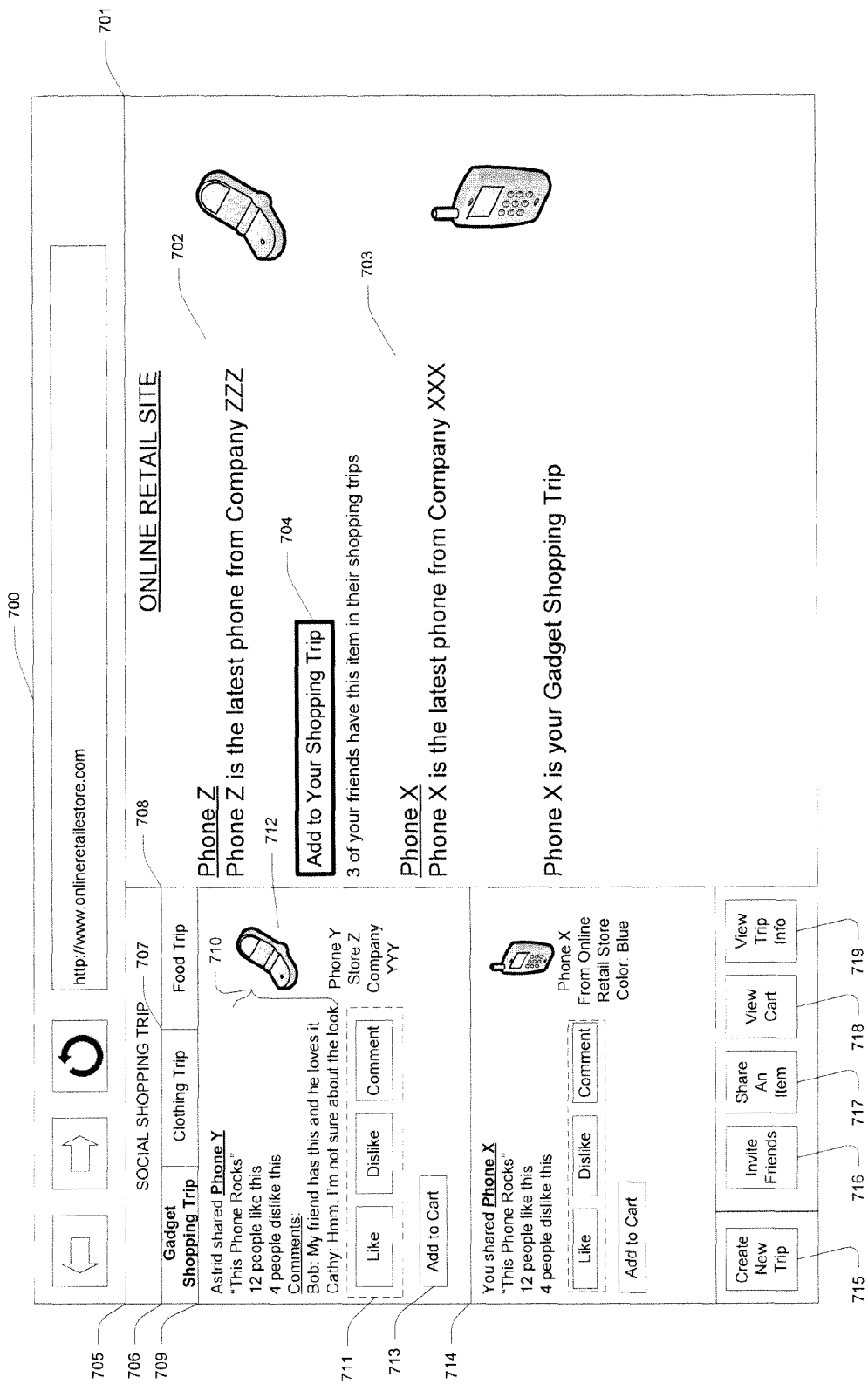
FIG. 7 illustrates an example screen shot of a graphical user interface displaying a web browser including a social shopping application.

FIG. 7 illustrates an example screen shot of a graphical user interface displaying a web browser 700 including a social shopping application. In the illustrated example, the social shopping trip application is illustrated as a browser extension displayed on the browser window along with an online retail site being visited by a user. The web browser 700 includes a task bar area including an address bar and one or more navigation buttons. The browser window further includes a web site display area 701 and a shopping trip application display area 705. An online retail site being visited by a user is illustrated within the website display area 701. The online retailer site includes images of one or more items. In the example online retail site two items 702 and 703 available for sale are illustrated. Item 702 is a "phone Z" and includes an item name, description and photo. An embedded "add to your shopping trip" button 704 is included within the online retailer site for facilitating the adding of the item from the site to the social shopping trip of the user. The online retailer site further displays social information regarding the item (e.g., whether contacts of the user have added the item to their social shopping trips). A second item 703, "phone X" is also displayed along with item information and a photo. "Phone X" is illustrated as being added to the social shopping trip of the user.

The social shopping application area 705 displays three separate social shopping trips within tabs 706, 707 and 708. Tab 706 includes items added to a social shopping trip labeled "Gadget shopping trip", tab 707 includes items added to a social shopping trip labeled "clothing trip" and tab 708 includes items added to a social shopping trip labeled "food trip". Tab 706 corresponding to the gadget shopping rip is displayed as being selected by the user and displays two items 709 and 714 having been added to the social shopping trip. Each item is displayed within a distinct item area. Information displayed for each item is generally described with respect to item 709.

The information regarding the phone as well as a photo of the item is displayed within an item information area 712. The tab 706 further displays comments regarding the item and social endorsement data regarding which people like the item 709 in a social information area 711. In addition feedback mechanisms 710 are included within the display area for facilitating the input of a comment regarding item 709, as well as endorsing or disliking the item. An "add to cart" button 713 is further displayed in association with the item 709 for allowing the user to add the item to a social shopping cart. Similar information is provided for a second item 714, the information including comments and social endorsement information, information and photo regarding the item, social input mechanisms and an add to cart button.

At the button of the social shopping application area 705 various input mechanisms are provided to allow the user to interact with the social shopping application. A "create new trip" button 715 facilitates the creation of a new social shopping trip. An "invite friends" button 716 allows the user to add more friends to one or more of his/her social shopping trips, the "share an item" button 717 allows the user to share one of his/items with one or more contacts in one or more social shopping trips. The "view cart" button 718 facilitates the navigation to the user's one or more social shopping carts, and a "view trip info" button 719 allows the user to view information regarding one or more of his/her social shopping trips.

Figure 8:
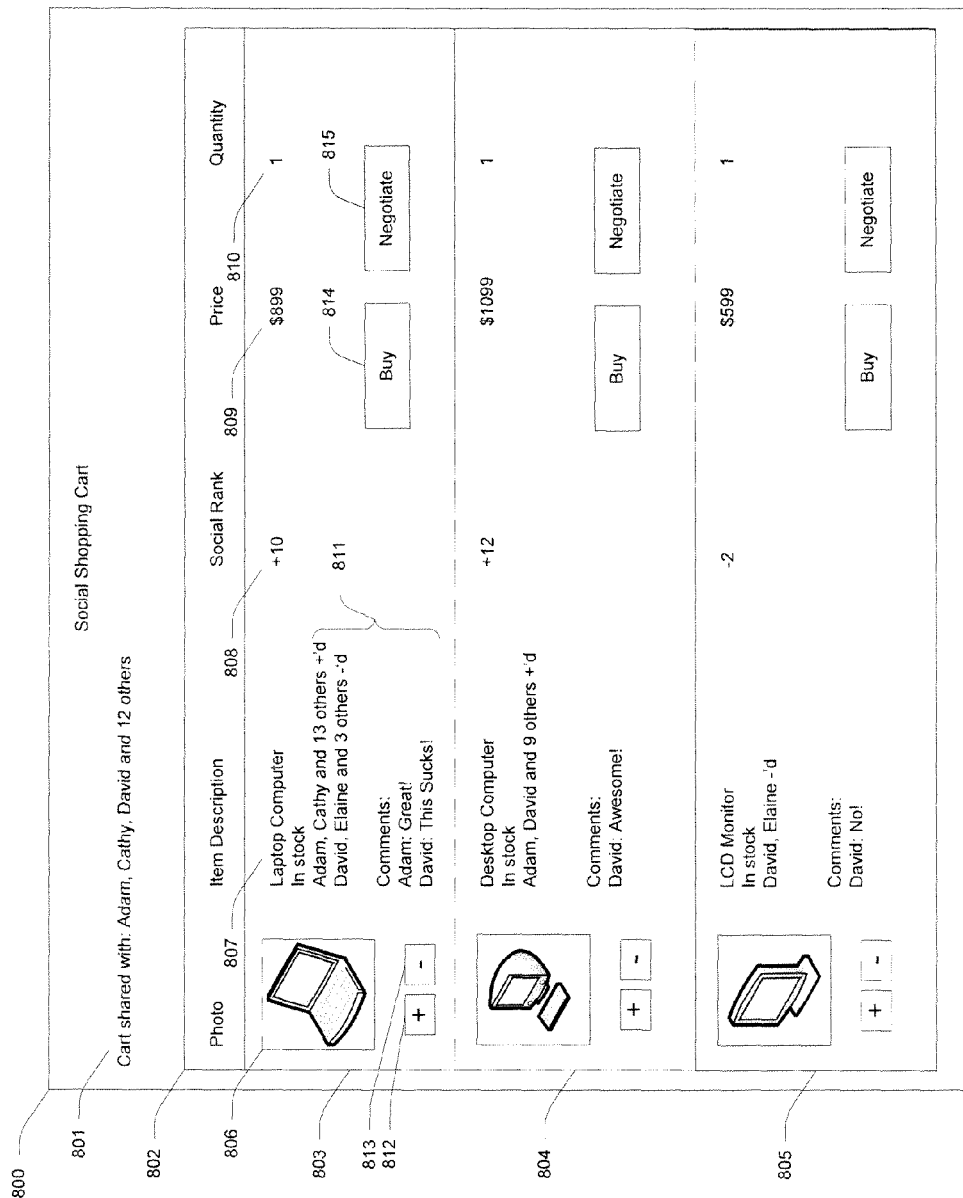
FIG. 8 illustrates a screen shot of a graphical user interface displaying an example social shopping cart.

FIG. 8 illustrates a screen shot of a graphical user interface displaying an example social shopping cart 800. The social shopping cart 800 includes a general display area 801, and an item display area 802. The general display area 801 provides general social information regarding the social shopping cart, including for example, whether the social shopping cart is being shared and/or viewed by contacts of the user. The item display area displays items 803, 804 and 805. Information displayed for each item is generally described with respect to item 803. Item 803 is displayed within the cart including a photo 806, an item description 807, a social rank 808, a price 809, a quantity 810, social information area 811, endorsement mechanisms 812 and 813 and purchase mechanisms 814 and 815. The social rank 808 may provide information regarding the popularity of the item among contacts of the user (e.g., participants within the social shopping trip that the item is posted). For example, item 803 is indicated as having a social ranking of +10, indicating that of the people who provided feedback, 10 more people endorsed rather than provide negative feedback regarding the item.

Further detail regarding the feedback of contacts regarding the item is provided in the social information area 811. The social information area 811 provides information regarding how many contacts provided positive endorsements rather than negative input regarding the item, and may further provide the identity of those users. Additionally, the social information area displays comments regarding the item provided by contacts. The feedback displayed as the social information area 811 may comprise feedback provided by participants of the a social shopping trip where the item is posted and is displayed within the cart and updated as the feedback information is provided at the social shopping trip.

The social rank assigned to each item within the social shopping cart is calculated here as the difference between the positive endorsements (+s) and the negative feedback (−s) of the users with regard to the item, however, other feedback data such as votes, ratings, and comments may also be considered when calculating the social rank for each item. The items within the social shopping cart may be ranked according to the social ranking. This makes the decision making process more efficient where the user is able to make purchasing decisions based on how his/her contacts have responded to the item (e.g., based on the positive/negative feedback or endorsement of the item).

Figure 9A:
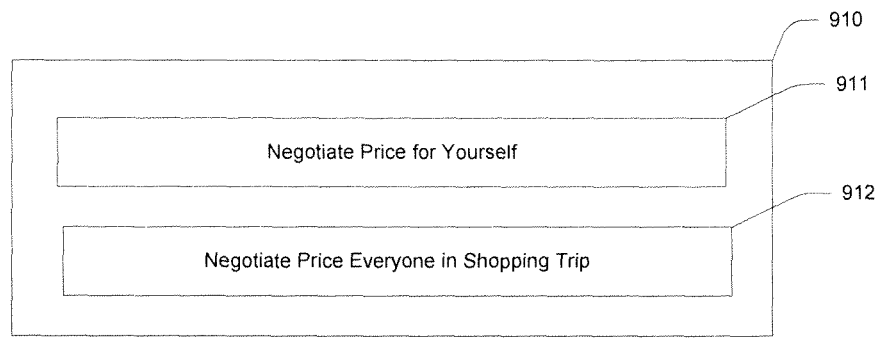
FIGS. 9A, 9B and 9C illustrate example messages displayed to the user within a graphical user interface during the negotiation process.
Figure 9B:
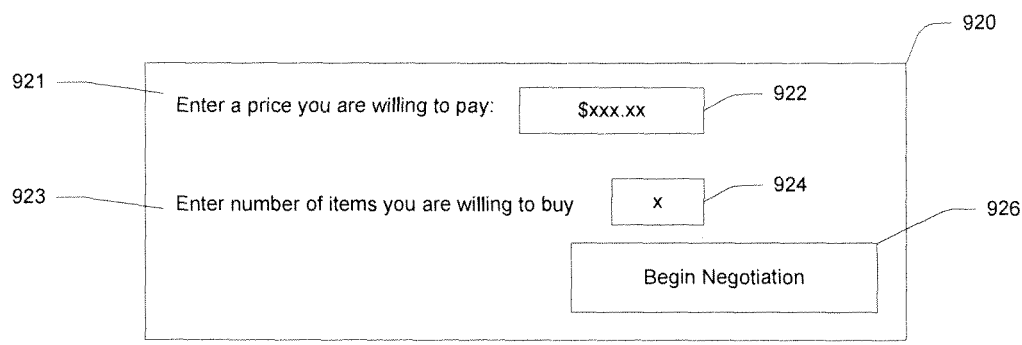
Figure 9C:
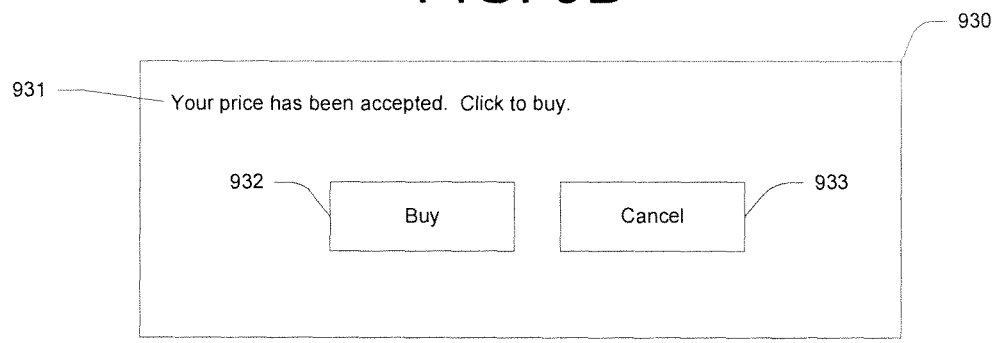

The endorsement mechanisms 812 and 813 allow the user to provide feedback regarding the item. A "buy" button 814 is provided and allows the user to request to purchase the item. Additionally, as illustrated, a "negotiate" button 815 may be provided to allow the user to request that the listed price 809 of the item be negotiated by the system. In one example, the user may select the negotiate button 815 to request a price negotiation. FIGS. 9A, 9B and 9C illustrate screen shots of a graphical user interface displaying example messages to the user during the negotiation process.

FIGS. 9A, 9B and 9C illustrate example messages displayed to the user within a graphical user interface during the negotiation process. Once the user selects to negotiate a price of an item (e.g., by selecting the negotiate button 815 of FIG. 8), the user graphical user interface may display a first message window 910 illustrated in FIG. 9A. The message window 910 provides the user with selection mechanisms for selecting between two possible negotiation options. The "negotiate price for yourself" button 911 allows the user to select to negotiate the price of an item only for himself/herself.

The "negotiate price for everyone in shopping trip" 912 provides can be selected by the user where the user wishes to participate in group negotiation where the price of the item is negotiated for all participants of the social shopping trip where the item is posted. Upon making the selection, the system then causes a second message window 920, illustrated in FIG. 9B, to be displayed with the graphical user interface displayed at the user client device. The message window 920 includes a price entry box 921, which queries the user to input a negotiation price point (e.g., the price the user is willing to pay), and a quantity entry box 922, which provides the user with means for entering the number or quantity of the item that the user and/or all members of the social shopping trip are willing to buy. Once the user has entered the appropriate information, the user may then select the "begin negotiation" button 923 to begin the negotiation process. Once the system has completed, and if the negotiation is successful, the negotiation process, a third message window 930, illustrated in FIG. 9C, is displayed to the user. The message window 930 provides a confirmation message, notifying the user that the negotiation was successful. The user may then select the "buy" button 932 to purchase the item, or may select to "cancel" to return to his/her shopping cart. In one example, a different message window may be displayed to the user when the negotiation is not successful, or the system may automatically revert the user to his/her social shopping cart, or may display the message window 920, illustrated in FIG. 9B (or a similar message window) such that the user can enter a new price or quantity to retry the negotiation.

V. Example System for Facilitating a Social Shopping Experience

Figure 10:
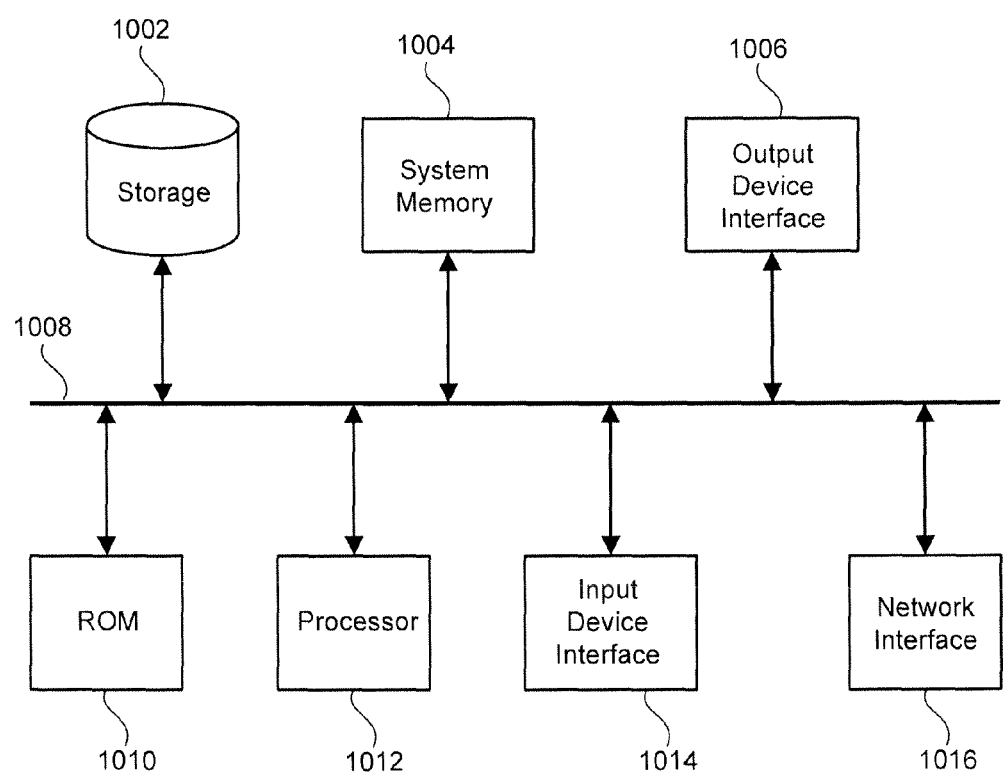
FIG. 10 conceptually illustrates an electronic system with which some implementations of the subject technology are implemented.

FIG. 10 conceptually illustrates an electronic system with which some implementations of the subject technology are implemented. Electronic system 1000 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 1000 includes a bus 1008, processing unit(s) 1012, a system memory 1004, a read-only memory (ROM) 1010, a permanent storage device 1002, an input device interface 1014, an output device interface 1006, and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for facilitating a social shopping experience. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interfaces 1006 enables, for example, the display of images generated by the electronic system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1008 also couples electronic system 1000 to a network (not shown) through a network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

These functions described above can be implemented in digital electronic circuitry, in computer software, firmware or hardware. The techniques can be implemented using one or more computer program items. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that all illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software item or packaged into multiple software items.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other headings and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method executed by one or more computing devices for providing a user participating in an online shopping environment with a negotiated price for an item, the method comprising:
    receiving a request to negotiate a price of an item being posted to an online shopping environment and offered at a first price, wherein the item is posted to the online shopping environment using data obtained from a remote service without redirecting to the remote service;
    identifying, using the one or more computing devices, purchase context information corresponding to the item in response to receiving the request, wherein the purchase context information includes information regarding the item and information regarding the online shopping environment, the purchase context information comprising a number of users indicating interest to purchase the item at a lower price;
    determining, using the one or more computing devices, a negotiated price for the online item based on the purchase context information and based on the number of users being greater than or equal to a threshold number of users; and
    providing the negotiated price for display to one or more users.

2. The method of claim 1, wherein the determining step comprises:
    identifying negotiation criteria associated with the item, the negotiation criteria defining conditions that when met result in the negotiated price;
    comparing the purchase context information and the negotiation criteria; and
    determining that the purchase context information meets the conditions in response to the comparing.

3. The method of claim 1, wherein the determining step comprises:
    determining a store associated with the item;
    transmitting a request for a negotiated price to the store including the purchase context information; and
    receiving the negotiated price from the store in response to the request.

4. The method of claim 1, wherein the request comprises a request from at least one of the one or more users.

5. The method of claim 1, wherein the online shopping environment comprises a social shopping trip, the social shopping trip including one or more items including the item and providing a mechanism for receiving feedback regarding the one or more items, and wherein the one or more users comprise one or more participants of the social shopping trip.

6. The method of claim 1, wherein the purchasing context information includes whether the request to negotiate comprises a request to negotiate the price of the item for an individual or a request to negotiate the price of the item with respect to a group of users.

7. The method of claim 1, further comprising:
    determining a purchasing likelihood associated with the item based on one or more of a current offered price of the item, information regarding the item, information regarding one or more competing items available for purchase by the one or more users, and the information regarding the online shopping environment, the purchasing likelihood indicating the chances of the item being purchased; and
    determining the negotiated price further based upon the purchasing likelihood.

8. The method of claim 1, wherein the purchasing context information further comprise information regarding one or more competing items, and
    wherein the one or more competing items comprise items that can be purchased as an alternative to the item and include a higher purchasing likelihood than the item, the purchasing likelihood indicating the chances of an item being purchased by at least one of the one or more users.

9. The method of claim 1, wherein the information regarding the item includes at least one of a current offered price of the item, the quantity of item being selected for purchase, information regarding the one or more users purchasing the item, information regarding one or more competing items, or feedback information regarding the item.

10. The method of claim 1, wherein the information regarding the online shopping environment includes one or more of item characteristics associated with the item or other items posted to the online shopping environment, number of participants in the online shopping environment, user preferences of users within the online shopping environment.

11. The method of claim 1, further comprising:
    determining one or more incentives other than the negotiated price in response to receiving the request; and
    providing the one or more incentives for display to the one or more users.

12. A system for providing a user participating in an online shopping environment with a negotiated price for an item, the system comprising:
    one or more processors; and
    a machine-readable medium comprising instructions stored therein, which when executed by the processors, cause the processors to perform operations comprising:
        identifying an item being posted to an online shopping environment and offered at a first price, wherein the item is posted to the online shopping environment using data obtained from a remote service without redirecting to the remote service;
        identifying purchase context information corresponding to the item, wherein the purchased context information includes a number of users indicating interest in purchasing the item at a lower price, and further includes at least one of information regarding the users indicating interest in purchasing the item at the lower price, one or more competing items, information regarding the one or more competing items, feedback information regarding the online item, feedback information regarding the competing items or information regarding the social shopping environment;

determining a negotiated price for the online item based on the purchase context information and based on the number of users being greater than or equal to a threshold number of users; and providing the negotiated price for display to one or more users.

13. The system of claim 12, the system further comprising:

receiving a request from at least one of the one or more users to obtain the negotiated price; and providing the negotiated price in response to the request.

14. The system of claim 12, wherein the determining step comprises:

identifying negotiation criteria associated with the item, the negotiation criteria defining conditions that when met result in the negotiated price;

comparing the purchase context information and the negotiation criteria; and determining that the purchase context information meets the conditions in response to the comparing.

15. A machine-readable medium comprising instructions stored therein, which when executed by a machine, cause the machine to perform operations comprising:

receiving a request to negotiate a price of an item being posted to an online shopping environment and offered at a first price, wherein the item is posted to the online shopping environment using data obtained from a remote service without redirecting to the remote service;

identifying purchase context information corresponding to the item in response to receiving the request, wherein the purchase context information includes information regarding the item and information regarding the online shopping environment, the purchase context information comprising a number of users indicating interest to purchase the item at a lower price;

determining a negotiated price for the online item based on the purchase context information and based on the number of users being greater than or equal to a threshold number of users, the determining step comprising:

identifying negotiation criteria associated with the item, the negotiation criteria defining conditions that when met result in the negotiated price;

comparing the purchase context information and the negotiation criteria; and determining that the purchase context information meets the conditions in response to the comparing; and providing the negotiated price for display to a user.

16. The machine-readable medium of claim 15, wherein the purchasing context information further comprise information regarding one or more competing items, and wherein the one or more competing items comprise items that can be purchased as an alternative to the item and include a higher purchasing likelihood than the item, the purchasing likelihood indicating the chances of the item being purchased with a negotiated price.

17. The machine-readable medium of claim 15, wherein the information regarding the item comprises one or more of the quantity of item being selected for purchase, information regarding the one or more users purchasing the item, one or more competing items, or feedback information regarding the item, and wherein the information regarding the online shopping environment includes one or more of item characteristics associated with the item, number of participants in the social shopping environment, user preferences of users within the online shopping environment, or other items posted to the online shopping environment.

\* \* \* \* \*